Sept. 11, 1951  L. M. GRIMES  2,567,704
EXTRUSION APPARATUS
Filed Aug. 31, 1948  2 Sheets-Sheet 1
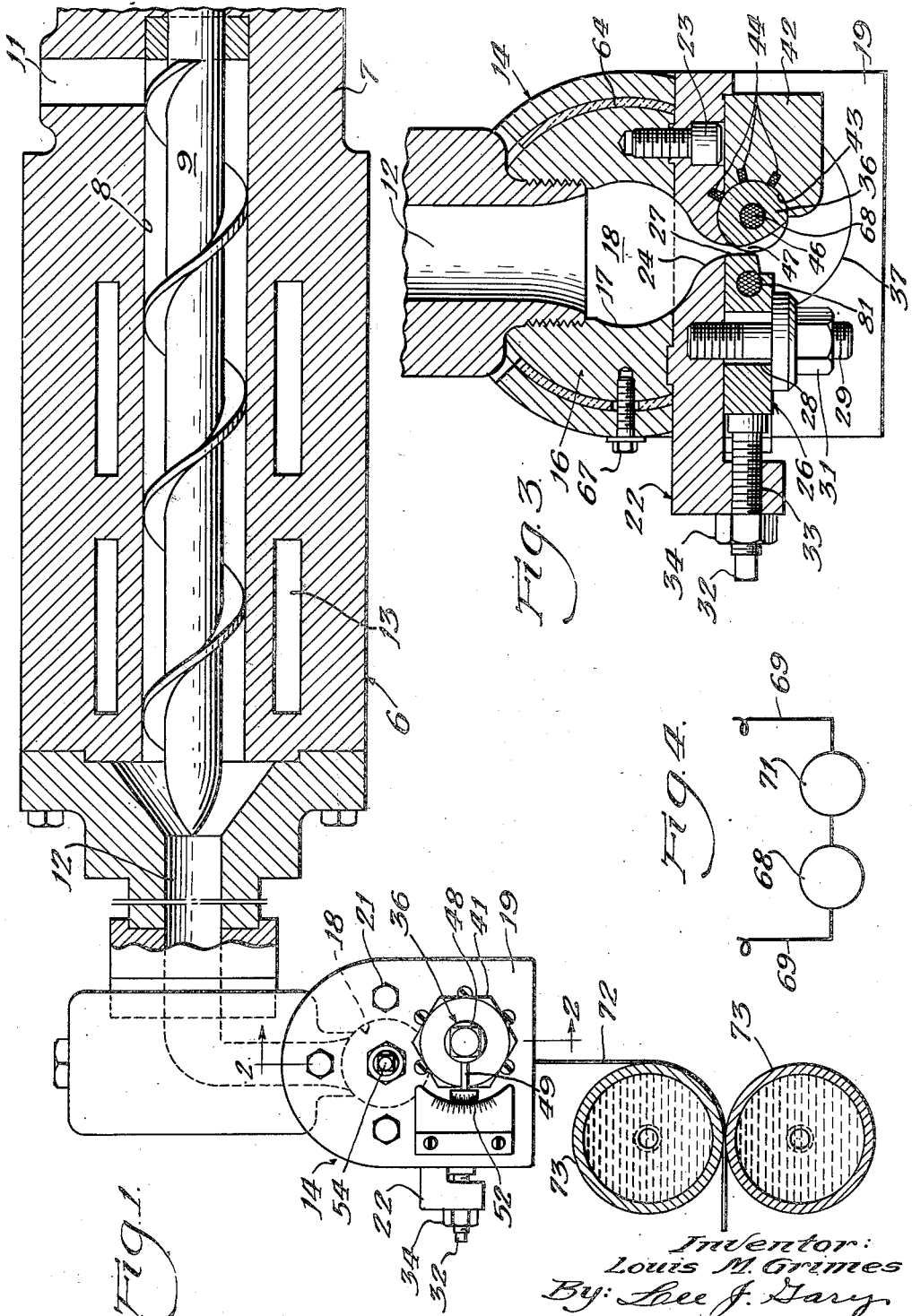
Inventor:
Louis M. Grimes
By: Lee J. Gary
Attorney

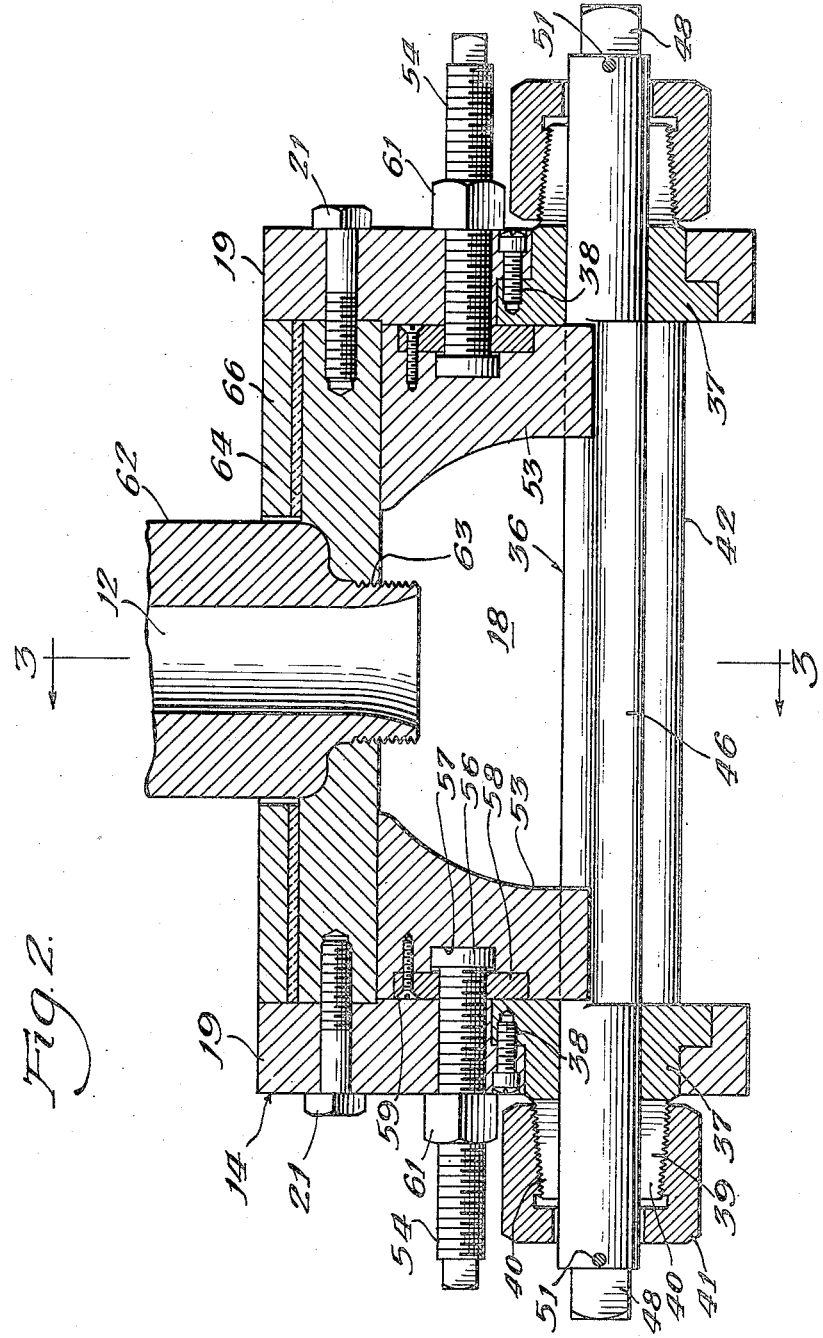

Patented Sept. 11, 1951

2,567,704

UNITED STATES PATENT OFFICE 2,567,704

EXTRUSION APPARATUS

Louis M. Grimes, Chicago, Ill.

Application August 31, 1948, Serial No. 47,071

11 Claims. (Cl. 18—12)

This invention relates to improvements in extrusion apparatus, and is more particularly concerned with the provision of an apparatus adapted for use in extruding plastic material to form sheets of predetermined width and thickness. The present apparatus is contemplated for use with a plastic material which is rendered soft and viscous by the application of heat.

This invention further contemplates the provision of an extrusion apparatus in which plastic stock in the form of strips, briquettes, powder or granules is first treated within a conventional screw-type extrusion machine having a water-jacketed cylinder filled with heated water or oil to maintain the cylinder at a temperature of from 350° F. to 500° F. During the operation of the conventional extrusion machine, the plastic material is heated and subjected to a kneading and folding action to provide a homogeneous mass of uniform heat and consistency for extrusion through the outlet end of the machine.

This invention further contemplates the provision of an extrusion apparatus in which the plastic mass is first extruded from the outlet of a conventional extrusion machine, and then through an extrusion head or die which is adjustable to control the width and thickness of the sheet material.

It is a further object of this invention to provide an extrusion head or die provided with a rotary gate mounted for rotational adjustment to control the thickness of the sheet material, the rotary gate being provided with a heating unit to impart a glazed surface to the sheet material. The temperature of the rotary gate is adapted to be adjustably controlled by means of suitable thermostats in order that the exact and correct temperature shall be applied at the point of extrusion to provide a sheet material having maximum sheen and density and absence of surface imperfections.

It is a further object of this invention to provide an extrusion head or die provided with a pair of end plugs to coact with the rotary gate in forming the sheet material, the end plugs being adjustable toward or away from each other to vary the width of the sheet material.

This invention further contemplates a provision of means for treating the sheet material after same has been extruded from the extrusion head or die. It will be understood that the type of further treatment to the sheet material will vary depending upon the type of plastic material being used. For example, for plastics such as rubber no further processing is necessary. For other types of plastics, it is necessary to chill the sheet material by means of hollow chill rolls filled with cold water. For plastic sheets which are to be subsequently calendered or coated with adhesives, the necessary equipment is available on the open market.

This invention embodies other novel features, details of construction and arrangement of parts which are hereinafter set forth in the specification and claims, and illustrated in the accompanying drawings wherein:

Fig. 1 is a side elevational view, partly in section, illustrating an extrusion apparatus embodying features of this invention.

Fig. 2 is a longitudinal sectional view taken along the line 2—2 of Fig. 1.

Fig. 3 is a transverse sectional view taken along the line 3—3 of Fig. 2.

Fig. 4 is a wiring diagram.

Referring now to the drawings for a better understanding of this invention, the extrusion apparatus is shown as comprising a conventional extruding machine 6 comprising an elongated housing 7 provided with a longitudinally extending bore 8 to receive a screw 9. The housing 7 is provided with a material inlet passageway 11 and a material outlet passageway 12. A suitable driving means (not shown) is provided to rotate the screw conveyor 9 to move the plastic stock from the inlet end of the housing through the outlet passageway 12. The housing 7 is provided with one or more passageways 13 provided with inlets and outlets (not shown) for the passage of heated water or oil. During the passage of plastic stock through the housing 7, it is subjected to a kneading and folding action to form a homogeneous mass of uniform consistency and of uniform heat for extrusion through the outlet passageway 12.

The plastic mass passes through the passageway 12 to an extrusion head or die which is generally indicated at 14. The die comprises a housing 16 bored at 17 to provide an extrusion chamber 18 which is closed at its ends by means of end plates 19—19. The end plates 19—19 are secured to the ends of the housing 16 by means of cap screws 21. A cover plate 22 is secured to the housing 16 by means of cap screws 23 and is formed with a longitudinally extending slot 24 leading outwardly from the extrusion chamber 18. It will be noted that the wall of the bore 17 is in registry with the walls defining the slot 24 to provide a smooth, continuous surface leading outwardly from the extrusion chamber 18. The cover plate 22 is equal to the housing 16 in length to abut against the inner faces of the end plates 19—19.

An adjustment blade 26 extends along the outer surface of the cover plate 22 for abutting engagement against the end plates 19—19. The adjustment blade 26 is preferably formed of hardened steel, having its forward edge 27 provided with a smooth glossy finish adapted to produce a smooth surface finish on the plastic material as same is extruded from the chamber 18. The blade 26 is provided with slots 28 for the passage of studs 29 which have their inner ends threaded into threaded openings provided in a cover plate 22. The outer ends of the studs 29 are threaded to receive nuts 31 to clamp the adjustment blade 26 against the outer surface of the cover plate 22. A pair of adjustment screws 32 extend through threaded openings 33, provided in cover plate 22, for engagement against the backside of the adjustment blade 26. Each adjustment screw is provided with a lock nut 34.

A rotary gate 36 is journaled at its ends on bearings 37—37 mounted in the end plates 19—19, the bearings being secured to their respective plates by means of cap screws 38. Each bearing 37 is formed with an outwardly projecting boss 39 which is formed with externally tapered threads to receive an internally threaded clamping nut 41. Each boss is formed with radially extending slots forming a plurality of fingers for movement into clamping engagement against the adjacent surface of the rotary gate 36 when the clamping nut 41 is threaded inwardly. A sealing plate 42 is secured to the outer surface of the cover plate 22 by means of suitable cap screws (not shown) and is formed for abutting engagement against the opposing inner surfaces of the end plates 19—19. The cover plate 22 and sealing plate 42 are formed with an annular bearing surface 43 to snugly receive the rotary gate 36, and these plates are also provided with a plurality of longitudinally extending grooves to receive sealing strips 44 which may be formed from lead, asbestos composition or other gasket material. One side of the rotary gate is cut away at 46, between the end plates 19—19, to define with the face 27 a passageway 47 of variable width. The ends of the rotary gate are formed square at 48 to accommodate a wrench (not shown) for rotating the gate. Pointers 49—49 mounted in apertures 51—51 formed in the ends of the rotary gate 36 to indicate on a graduated scale 52 the width of the passageway 47 between the rotary gate and the surface 27 of the blade 26.

A pair of adjustable end plugs 53—53 are mounted in opposing relation at the ends of the extrusion chamber 18 to determine the width of the sheet being extruded through the passageway 47. An adjustment screw 54 is threaded through each end plate 19 to engage its respective plug 53. The inner end of each screw 54 is provided with a head portion 56 which is secured in a recess 57 by means of a cover plate 58. The cover plate is secured to its plug by means of screws 59. A lock nut 61 is provided with each adjustment screw 54. Each adjustment screw serves to move its respective plug 53 longitudinally through the extrusion chamber 18 to thereby vary the width of the sheet material being extruded.

The passageway 12 is defined by a suitable conduit 62 which is threaded into the housing 16 at 63 to direct the plastic mass into the extrusion chamber 18. If desired, the housing 16 may be enclosed with a suitable insulating material 64 and a cover 66 which is secured to the housing 16 by means of cap screws 67.

The rotary gate 36 is provided with an axial bore to receive an electrical heating element 68 which is connected to a source of electrical energy by means of conduits 69. As shown diagrammatically in Fig. 4, a suitable thermostat 71 is interposed in the circuit 69 to maintain the temperature of the heating element 68 and rotary gate 36 within a predetermined temperature range. Thermostat 71 may be positioned within the axial bore of the rotary gate, if desired.

As illustrated in Fig. 1, the extruded plastic sheet 72 may, if desired, be passed between a pair of cooling rolls 73—73 filled with cold water. It is contemplated, however, that the cooling rolls 73—73 may be either omitted or replaced by other conventional equipment for treating the extruded sheet 72.

In the manufacture of plastic sheets, the stock is first fed into the longitudinally extending chamber 8 of the extrusion machine through the feed inlet 11. The stock is then moved through the chamber 8 by means of the screw conveyor 9 which acts to fold and refold the plastic mass. While the plastic mass is within the mixing chamber 8, it is heated to a predetermined temperature by means of hot water passing through the passageway 13 in the housing 7. As the plastic mass reaches the outlet passageway 12, it is of uniform heat and consistency throughout, and free of objectionable air-pockets or voids.

The plastic mass is directed to the passageway 12 into the extrusion chamber 18 and thence outwardly through the restricted passage 47 in the form of a sheet. As the material is extruded through the passage 47, it is subjected on one side to an ironing action by means of the rotary gate 36 which is heated to a predetermined temperature by means of the thermostatically controlled heating element 68. It has been found that a rotary gate heated to a predetermined temperature acts to provide a plastic sheet having an improved surface sheen and density.

The thickness or gauge of the sheet material is controlled by rotating the rotary gate 36 in a clockwise or counter-clockwise direction to increase or decrease the width of the extrusion aperture 47. The pointers 49 and graduated scales 52 are provided to indicate to the operator the thickness of the sheet material being extruded. If necessary, the blade 26 may be adjusted toward or away from the rotary gate 36 by means of the adjustment screws 32 and lock nuts 31.

The width of the sheet material 72 may be varied by merely adjusting the positions of the end plugs 54—54. It will, however, be noted that the end plugs 53—53 are in the form of inverted teardrops conforming to and snugly received within the extrusion chamber 18, the lower longitudinally extending edge portions of each end plug extending outwardly through the cover plate 22 and terminating within the extrusion slot 47 between the blade 26 and the rotary gate 36.

If desired, a thermostatically controlled heating element 81 may be mounted in a longitudinal opening provided through the forward end of the blade 26, as illustrated in Fig. 3 in the drawings. By heating the forward end of the blade 26 and the rotary gate 36, both surfaces of a plastic sheet are subjected to an ironing action to provide an improved surface sheen.

While this invention has been shown in but one form, it is obvious to those skilled in the art that it is not so limited but is susceptible of various changes and modifications without departing from the spirit and scope of the claimed invention.

I claim as my invention:

1. In an apparatus for extruding a plastic sheet, an extrusion head formed with an elongated extrusion chamber, said head having inlet and outlet passageways for directing a plastic mass into and out of said chamber, a rotary gate formed with an eccentric surface disposed to vary the width of said outlet passageway, and adjustable plug means mounted in said extrusion chamber to adjustably control the length of said outlet passageway.

2. An extrusion head for forming a plastic sheet, comprising a housing, said housing having an elongated extrusion chamber, a cover plate secured to said housing and formed with an elongated slot, a blade secured to said cover plate, and a gate mounted on said cover plate and having an eccentric outer surface disposed in spaced parallel relation to said blade to define an elongated passageway in registry with said elongated slot, said gate being rotatable about its axis to vary the width of said elongated passageway.

3. An extrusion head for forming a plastic sheet, comprising a housing, said housing having an elongated extrusion chamber, a cover plate secured to said housing and formed with an elongated slot, a blade secured to said cover plate, and a gate mounted on said cover plate and having an eccentric outer surface disposed in spaced parallel relation to said blade to define an elongated passageway in registry with said elongated slot, said gate being rotatable about its axis to vary the width of said elongated passageway, said blade being adjustable to vary the width of said passageway.

4. An extrusion head for forming a plastic sheet, comprising a housing, said housing having an elongated extrusion chamber, a cover plate secured to said housing and formed with an elongated slot, a blade secured to said cover plate, and a gate mounted on said cover plate and having an eccentric outer surface disposed in spaced parallel relation to said blade to define an elongated passageway in registry with said elongated slot, said gate being rotatable about its axis to vary the width of said elongated passageway, and an electrical heating unit provided in said gate.

5. An extrusion head for forming a plastic sheet, comprising a housing, said housing having an elongated extrusion chamber, a cover plate secured to said housing and formed with an elongated slot, a blade secured to said cover plate, a gate mounted on said cover plate and having an eccentric outer surface disposed in spaced parallel relation to said blade to define an elongated passageway in registry with said elongated slot, said gate being rotatable about its axis to vary the width of said elongated passageway, and plug means mounted in spaced relation within said extrusion chamber to determine the length of said elongated passageway.

6. An extrusion head for forming a plastic sheet, comprising a housing, said housing having an elongated extrusion chamber, a cover plate secured to said housing and formed with an elongated slot, a blade secured to said cover plate, a gate mounted on said cover plate in spaced parallel relation to said blade to define an elongated passageway in registry with said elongated slot, said gate being rotatable about its axis to vary the width of said elongated passageway, plug means mounted in spaced relation within said extrusion chamber to determine the length of said elongated passageway, and means to adjust the positions of said plug means within said extrusion chamber to vary the length of said elongated passageway.

7. An extrusion head for forming a plastic sheet, comprising a housing, said housing having an elongated extrusion chamber, a cover plate secured to said housing and formed with an elongated slot, a blade secured to said cover plate, a gate mounted on said cover plate in spaced parallel relation to said blade to define an elongated passageway in registry with said elongated slot, said gate being rotatable about its axis to vary the width of said elongated passageway, plug means mounted in spaced relation within said extrusion chamber to determine the length of said elongated passageway, means to adjust the positions of said plug means within said extrusion chamber to vary the length of said elongated passageway, and an electrical heating unit extending axially through said gate.

8. An extrusion head for forming a plastic sheet, comprising a housing, said housing having an elongated extrusion chamber, a cover plate secured to said housing and formed with an elongated slot, a blade secured to said cover plate, a gate mounted on said cover plate in spaced parallel relation to said blade to define an elongated passageway in registry with said elongated slot, said gate being rotatable about its axis to vary the width of said elongated passageway, plug means mounted in spaced relation within said extrusion chamber to determine the length of said elongated passageway, means to adjust the positions of said plug means within said extrusion chamber to vary the length of said elongated passageway, an electrical heating unit extending axially through said gate, and thermostat means to control the temperature of said gate.

9. An extrusion head for forming a plastic sheet, comprising a housing, said housing having an elongated extrusion chamber, a cover plate secured to said housing and formed with an elongated outwardly converging slot, a blade adjustably secured to said cover plate, a gate mounted on said cover plate in spaced parallel relation to said blade to define an elongated passageway in registry with said elongated slot, said gate being rotatable about its axis to vary the width of said elongated passageway, plug means mounted in spaced relation within said extrusion chamber to determine the length of said elongated passageway, means to adjust the positions of said plug means within said extrusion chamber to vary the length of said elongated passageway, an electrical heating unit extending axially through said gate, and thermostat means to control the temperature of said gate.

10. An extrusion head for forming a plastic sheet, comprising a housing, said housing having an elongated extrusion chamber, a cover plate secured to said housing and formed with an elongated slot, an electrically heated blade secured to said cover plate, and an electrically heated gate mounted on said cover plate and having an eccentric outer surface disposed in spaced parallel relation to said electrically heated blade to define an elongated passageway in registry with said elongated slot, said gate being rotatable about its axis to vary the width of said elongated passageway.

11. An extrusion head for forming a plastic sheet, comprising a housing, said housing having an elongated extrusion chamber, a cover plate secured to said housing and formed with an elongated slot, a blade secured to said cover plate, means for heating said blade, and a gate mounted on said cover plate having an eccentric outer surface disposed in spaced parallel relation to said blade to define an elongated passageway in registry with said elongated slot, said gate being rotatable about its axis to vary the width of said elongated passageway.

LOUIS M. GRIMES.

REFERENCES CITED

The following references are of record in the file of this patent:

UNITED STATES PATENTS

| Number | Name | Date |
|---|---|---|
| 124,431 | Fuller | Mar. 12, 1872 |
| 1,312,424 | Richardson | Aug. 5, 1919 |
| 1,350,722 | Goodenberger | Aug. 24, 1920 |
| 2,090,404 | Parkhurst | Aug. 17, 1937 |
| 2,297,645 | Bailey | Sept. 29, 1942 |
| 2,318,469 | Derby et al. | May 4, 1943 |

FOREIGN PATENTS

| Number | Country | Date |
|---|---|---|
| 414,535 | Great Britain | Aug. 9, 1934 |